2,983,722
Patented May 9, 1961

2,983,722
FUNGICIDAL COMPOUNDS

Carl Horowitz, Brooklyn, and Meyer Mendelsohn, New York, N.Y., assignors, by mesne assignments, to Yardney International Corp., New York, N.Y., a corporation of New York No Drawing. Filed Nov. 6, 1957, Ser. No. 694,714

4 Claims. (Cl. 260—209.6)

This case is a continuation-in-part of our co-pending application Ser. No. 410,446, filed February 15, 1954, now abandoned, and entitled "Fungicidal Compounds and Process for Making Same."

Our present invention relates to antimicrobic compounds and, more particularly, to compounds whose ability to combat the spread of microorganisms is effective primarily against fungi or against a combination of fungi and bacteria.

In various co-pending applications owned by the assignee of the present application, including Ser. No. 304,854 filed August 16, 1952, now U.S. Patent 2,785,106 issued March 12, 1957, and Ser. No. 345,741 (now abandoned) filed August 16, 1952, by Meyer Mendelsohn, one of the present applicants, and Ser. Nos. 364,970, 379,102, and 477,432 filed June 29, 1953, September 8, 1953, and December 23, 1954, respectively, by Jacob J. Bikerman and ourselves (all of which are now abandoned), there have been disclosed a number of antimicrobic silver compounds having definite antibacterial properties. These compounds are produced by reacting a silver salt with an organic polymeric material derived from a monomeric compound whose structure includes at least one hydroxyl group. Cellulose, thermoplastic substances, and various uronic acids along with their polymeric derivatives are among the organic materials active in such reactions.

Our present invention has for its object the production of substances having definite antifungal effects, preferably in combination with bactericidal or at least bacteriostatic powers.

In co-pending application Ser. No. 331,325, filed by Meyer Mendelsohn on January 14, 1953 (now abandoned), and in other of the above-identified co-pending applications there have been disclosed processes for producing double-salt compounds of the aforementioned polymeric organic materials with two metals, more specifically with silver and gold.

We have now found, in accordance with the instant invention, that a double-salt compound of certain of said polymeric materials with silver and either copper, cadmium or zinc will be effective against both bacteria and fungi.

Various examples of processes according to our invention will now be given by way of illustrating the reactions involved and the products resulting therefrom.

Example I

Alginic acid is partially depolymerized by maintaining it at 80° C. for 7 days or until the viscosity at 25° C. at or about neutral pH is equal to 1.3 centipoises. Five gms. of the material is dissolved in 100 cc. of water to which has been added 13 cc. of 10% KOH. The pH of the solution of partially depolymerized alginic acid is approximately 4. To this solution is added 2 gms. of CuO and 2 gms. of AgO. At the end of one hour of agitation the mixture is filtered and the filtrate is collected. The liquid contains the double salt silver-copper polyuronate. The material does not respond to any of the tests for free silver or copper. The solution is found to contain approximately 0.2 to 0.3% copper and 0.2 to 0.3% silver in combined form.

Example II

To 3 gms. of propylene glycol alginate dispersed in 100 cc. of distilled water at 60° C. after 10 minutes, 5 gms. of AgO and 5 gms. of CuO is added. The mixture is agitated for one hour and then filtered. The filtrate is similar to the liquid product of Example I in physical appearance and chemical properties. The silver and copper content of the solutions are also comparable. The resultant double salt in solution, when tested, is found to have antifungal and antibacterial properties.

Example III

To 5 gms. of depolymerized alginic acid (viscosity 1.3 centipoises), prepared as described in Example I, is added 100 cc. of water and 15 cc. of 10% KOH. To this solution is added 2 gms. of AgO and 2 gms. of ZnO. The mixture is stirred for one hour and then filtered. The filtrate contains a double salt, i.e. silver-zinc polyuronate, and assays between 0.2 and 0.3% of each metal. When tested by standard techniques (plate test) the compound shows significant bacteriostatic and fungistatic properties.

Example IV

A silver-cadmium-polyuronate double salt may be prepared by the method of Examples I and II. Instead of the copper and zinc oxides, cadmium oxide is used. This reaction is best carried out under slightly acid to neutral conditions, pH 5-7. This silver-cadmium salt as well as the salts prepared in Examples I and III can be precipitated from solution by the addition of alcohol.

Example V 100 gms. of alpha cellulose is immersed in a liter of water. To this are added concentrated solutions of silver and copper nitrates enough to achieve a final concentration of 1% of each of the salts. The mixture is boiled until the cellulosic material achieves a greenish coloration and shows on analysis approximately ½% each of copper and silver chemically combined with the cellulose. The material is then washed and dried. It possesses marked bacteriostatic and fungistatic properties.

Example VI

In the manner of Example V, 100 gms. of cellulose is reacted with soluble silver and cadmium salts. The double salt of cellulose is formed. It has a yellowish-gray appearance.

Example VII

In the manner of Example VI, 100 gms. of cotton cloth is reacted with soluble silver and zinc salts until the cotton is converted to a cloth having ½% silver and cadmium, respectively, chemically combined in the fibers.

It should be understood that other forms of cellulose may be substituted for either the alpha cellulose of Example V or the cotton cloth of Example VII. Suitable forms of cellulose include not only those listed but regenerated celluloses in fiber, sheet or sponge form as well as the combined celluloses including esters such as cellulose acetates, nitrates and butyrate and the various ethers of cellulose such as methyl and ethyl celluloses.

Alginic acid, before starting the depolymerization, when reacted as described does not yield the double salt compounds of this invention, as the antimicrobic qualities are much lower than those of the compounds of this invention. In a like manner, the hexuronic acid that results from the complete depolymerization of alginic acid yields double salt products of only negligible antimicrobic properties. The partially depolymerized alginic acid products that yield the double salt compounds possessing the highest antimicrobial qualities are those wherein the depolymerization has proceeded to the extent that the viscosity of the material at neutrality ranges from 1.25 to 1.75 centipoises.

We claim:

1. An antimicrobic agent comprising the reaction product of a partially depolymerized alginic acid whose viscosity at pH 7 ranges substantially between 1.25 and 1.75 centipoises, and the oxides of silver and of a metal chosen from the group consisting of copper, cadmium and zinc.

2. An antimicrobic agent comprising the reaction product of a partially depolymerized alginic acid whose viscosity at pH 7 ranges substantially between 1.25 and 1.75 centipoises, and the oxides of silver and zinc.

3. An antimicrobic agent comprising the reaction product of a partially depolymerized alginic acid whose viscosity at pH 7 ranges substantially between 1.25 and 1.75 centipoises, and the oxides of silver and copper.

4. An antimicrobic agent comprising the reaction product of a partially depolymerized alginic acid whose viscosity at pH 7 ranges substantially between 1.25 and 1.75 centipoises, and the oxides of silver and cadmium.

References Cited in the file of this patent

UNITED STATES PATENTS

| | | |
|---|---|---|
| 1,162,926 | Ingham | Dec. 7, 1915 |
| 2,259,767 | Myers | Oct. 21, 1941 |
| 2,294,925 | Miller et al. | Sept. 8, 1942 |
| 2,671,779 | Gaver et al. | Mar. 9, 1954 |
| 2,782,190 | Fischer | Feb. 19, 1957 |

FOREIGN PATENTS

| | | |
|---|---|---|
| 25,187 | Great Britain | 1905 |
| 476,376 | Great Britain | Dec. 2, 1937 |

OTHER REFERENCES

Jour. Soc. Chem. Ind., pages 518–520, Sept. 20, 1885.
Jour. Soc. Chem. Ind., pages 218–21, Apr. 29, 1886.